United States Patent
Yamada

(10) Patent No.: US 10,923,073 B2
(45) Date of Patent: Feb. 16, 2021

(54) DISPLAY CONTROL APPARATUS FOR A VEHICLE INFORMATION DISPLAY

(71) Applicant: Yazaki Corporation, Tokyo (JP)

(72) Inventor: Yoshihisa Yamada, Makinohara (JP)

(73) Assignee: YAZAKI CORPORATION, Tokyo (JP)

(\*) Notice: Subject to any disclaimer, the term of this patent is extended or adjusted under 35 U.S.C. 154(b) by 0 days.

(21) Appl. No.: 16/540,199

(22) Filed: Aug. 14, 2019

(65) Prior Publication Data

US 2020/0090621 A1    Mar. 19, 2020

(30) Foreign Application Priority Data

Sep. 18, 2018 (JP) .................. 2018-174123

(51) Int. Cl.
| | |
|---|---|
| *G09G 5/00* | (2006.01) |
| *G09G 5/373* | (2006.01) |
| *G09G 5/38* | (2006.01) |

(52) U.S. Cl.
CPC .......... *G09G 5/005* (2013.01); *G09G 5/373* (2013.01); *G09G 5/38* (2013.01); *G09G 2320/08* (2013.01); *G09G 2354/00* (2013.01); *G09G 2380/10* (2013.01)

(58) Field of Classification Search
CPC ......... G09G 5/005; G09G 5/373; G09G 5/38; G09G 2354/00; G09G 2380/10; G09G 2320/08; G09G 2370/08; G09G 2370/042; G09G 2340/045; G09G 2340/14; G09G 2340/0407; G09G 2340/0442; G09G 2340/0485; B60K 2370/577; B60K 2370/52; B60K 35/00; G06F 3/1454

See application file for complete search history.

(56) References Cited

U.S. PATENT DOCUMENTS

| | | | |
|---|---|---|---|
| 6,924,843 B1 | 8/2005 | Yamazaki et al. | |
| 2006/0282597 A1\* | 12/2006 | Plogmann | G09G 5/363 |
| | | | 710/303 |
| 2012/0182474 A1 | 7/2012 | Kobayashi et al. | |
| 2012/0249878 A1 | 10/2012 | Sawada et al. | |

(Continued)

FOREIGN PATENT DOCUMENTS

| | | |
|---|---|---|
| JP | 61-247147 A | 11/1986 |
| JP | 8-9461 A | 1/1996 |

(Continued)

*Primary Examiner* — Liliana Cerullo
(74) *Attorney, Agent, or Firm* — Sughrue Mion, PLLC

(57) ABSTRACT

In a display control apparatus, a cooperation unit capable of detaching from a meter device is prepared, and a smartphone is connected to the cooperation unit. The display control apparatus responds to changes in specification of a smartphone by cooperation function of the cooperation unit. The cooperation unit reads a cooperation pattern number stored in a memory on a meter device, and grasp an output image size, a display position, presence and absence of blank image. The cooperation unit receives an image data on a screen of the smartphone, and transmits image data in which change of display size, position adjustment and so on is performed to the meter device. The cooperation unit accepts a user input operation on an operation input device, transmits it to the smartphone so as to enable remote operation during driving.

5 Claims, 7 Drawing Sheets

(56) References Cited

U.S. PATENT DOCUMENTS

2014/0320528 A1   10/2014  Nanba et al.
2015/0019967 A1    1/2015  Gutentag et al.
2017/0154605 A1*  6/2017  Kajita .................... B60K 35/00

FOREIGN PATENT DOCUMENTS

| JP | 2000-250500 A | 9/2000 |
| JP | 2013-166400 A | 8/2013 |
| JP | 2016-144959 A | 8/2016 |

* cited by examiner

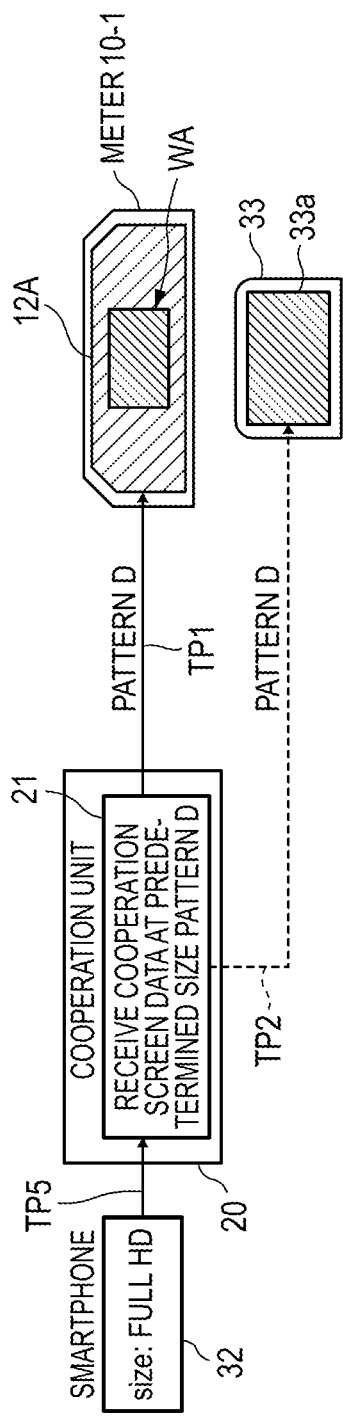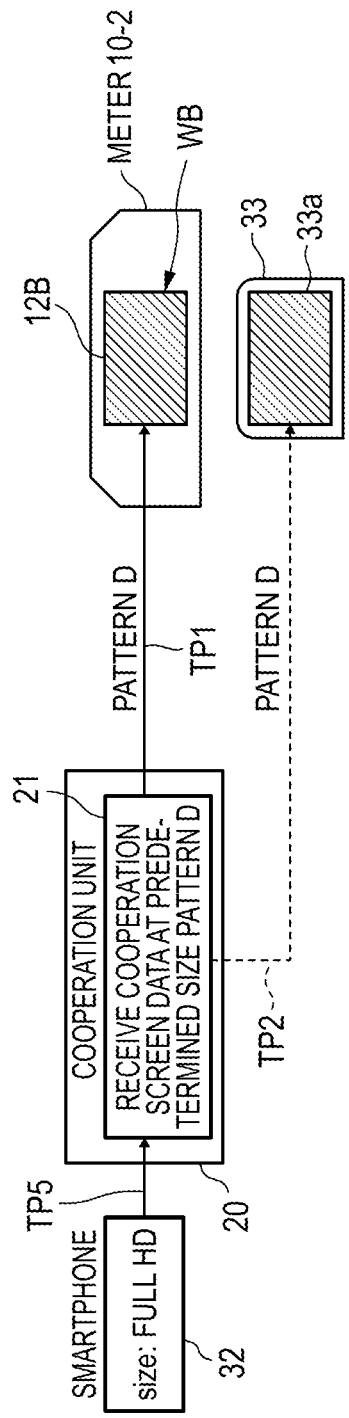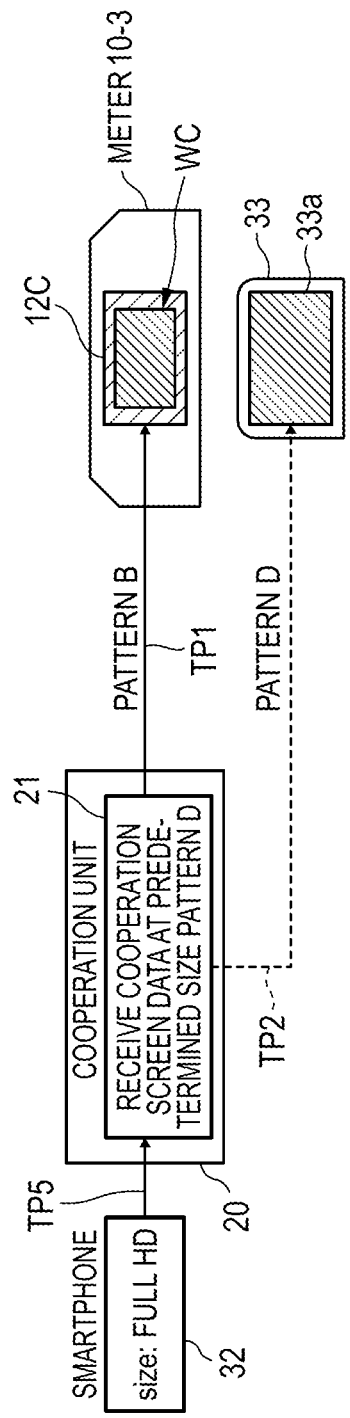

DISPLAY CONTROL APPARATUS FOR A VEHICLE INFORMATION DISPLAY

CROSS-REFERENCE TO RELATED APPLICATIONS

This application is based on and claims priority under 35 USC 119 from Japanese Patent Application No. 2018-174123 filed on Sep. 18, 2018, the contents of which are incorporated herein by reference.

TECHNICAL FIELD

The present invention relates to a display control apparatus applicable to a meter device or the like of a vehicle.

BACKGROUND ART

In recent years, mobile terminals such as smartphones have been frequently used in various circumstances. When a user of a mobile terminal uses a vehicle such as an automobile, it is necessary to use the mobile terminal in the vehicle for special application software that displays, for example, a map from the viewpoint of convenience.

However, viewing the screen of the mobile terminal directly while driving prevents the driver of the vehicle from concentrating on driving, and is thus necessarily inhibited from the viewpoint of safe driving. Therefore, it is required that information such as images displayed on the screen of the mobile terminal be visually recognized without the driver diverting eyes greatly while remaining in the normal driving state.

For example, Patent Literature 1 discloses a vehicle instrument device that displays the same image as the display screen of a mobile terminal in a part of a vehicle information display area of a meter unit which is an instrument mounted on a vehicle.

CITATION LIST

Patent Literature

Patent Literature 1: JP-A-2016-144959

SUMMARY OF INVENTION

When the technology disclosed in Patent Literature 1 is applied to a vehicle, it is necessary to add a dedicated circuit for displaying the screen of the mobile terminal on a control circuit board in the housing of the meter unit. However, such a dedicated circuit has to be designed for each product according to its specifications and is thus not universal.

For example, the number of pixels on the display screen of the display in the meter unit differs depending on the type and grade of the vehicle on which the display is mounted. Therefore, image data output from the mobile terminal have to be processed so that the screen of the mobile terminal can be displayed on the display screen of the meter unit in an appropriate state. Therefore, dedicated circuits with poor universalness and software for controlling the dedicated circuits are individually required for each grade of vehicles.

Further, the meter unit for a vehicle is regulated by law and subjected to various restrictions. For this reason, the meter unit is not detached from the vehicle until a failure occurs or end of the life of the vehicle. On the other hand, functions and interfaces of the mobile terminal such as a smartphone used by a user of a vehicle change and improve in a short cycle of about one year, and users generally tend to replace their mobile terminals in a short cycle of about several years.

Therefore, even if the user can connect his or her mobile terminal to the meter unit of the vehicle at the time of purchasing the vehicle, a mismatch of specifications of interfaces and the like may occur when the user replaces the mobile terminal. That is, communication between a newly purchased mobile terminal and the meter unit may fail, and positional deviation or deformation may occur in the form of screen display.

The present invention is made in view of the above circumstances, and an object of the present invention is to provide a display control apparatus that can easily deal with changes in specifications of a mobile terminal when a screen of a user's mobile terminal is displayed on a screen of a meter unit and the like mounted on a vehicle.

In order to achieve the above object, the display control apparatus according to the present invention has the following (1) to (5) features.

(1) The display control apparatus includes: a control device connected to a display device and configured to output image data to the display device and display an image on a display screen; and an additional control device retrofitted to the control device and configured to output image data input from an external terminal to the control device.

The control device includes a storage unit that stores setting information on a display form of an image on the display screen.

The additional control device includes a data modification unit configured to acquire the setting information from the control device, modify the image data input from the external terminal into data in accordance with the display mode based on the setting information, and output the data to the control device.

(2) In the display control apparatus according to (1), the setting information contains information on a display size of an image on the display screen.

The data modification unit modifies the image data input from the external terminal so that a display size of the image data matches the display size contained in the setting information.

(3) In the display control apparatus according to (1) or (2), the setting information contains information on a display position of an image on the display screen.

The additional control device modifies the image data input from the external terminal so that an image of the image data on the display screen is in the display position contained in the setting information.

(4) The display control apparatus according to any one of (1) to (3) further includes an operation input unit configured to output an operation signal for changing an output state of image data in the external terminal in response to an input operation.

The additional control device outputs the operation signal input from the operation input unit to the external terminal and changes the output state.

(5) In the display control apparatus according to any one of (1) to (4), the display screen is a meter display that displays information indicating a traveling state of a vehicle.

The control device acquires the information indicating a traveling state, generates image data related to the traveling state, synthesizes an image of the generated image data and an image of the image data input from the external terminal, and displays the synthesized image on the display screen.

According to the display control apparatus having the configuration of (1), an image or the like output from the external terminal can be displayed on the display screen of the display device via the control device and the additional control device retrofitted to the control device. Herein when specifications of the display size, interfaces, and the like of the external terminal change, it is possible to cope therewith by changes to the additional control device alone without necessary changes to the control device. Moreover, display can be realized in an appropriate form corresponding to specification changes in the external terminal or a plurality of types of specifications of the display device, since it is possible to select an appropriate display form using the setting information stored in the storage unit of the control device. For example, assuming that the display device and the control device are accommodated in a vehicle meter unit, external terminals of various specifications can be connected without changes to the meter unit. Even when there are a plurality of types of meter units having different screen display sizes or the like, the display can be realized in an appropriate display form for any type of meter unit by using the setting information.

According to the display control apparatus having the configuration of (2), the additional control device modifies the size of image data. Accordingly, the additional control device can output the image data to the control device in accordance with the display size required by the display device. Therefore, it is possible to match display sizes for a plurality of types of specifications of the display screen and a plurality of types of specifications of image data output from the external terminal.

According to the display control apparatus having the configuration of (3), the additional control device modifies the position of image data. Accordingly, it is not necessary to adjust the scaling or position of an input image in the display device. Therefore, when there is a plurality of types of specifications for the display screen, the display position of the image can be matched with the required position for any of the specifications. Further, the display control apparatus is also advantageous in terms of cost since no image processing is performed.

According to the display control apparatus having the configuration of (4), the operation signal input from the operation input unit can be input to the external terminal via the addition control device. That is, the external terminal can be remotely operated by the operation signal from the operation input unit. Therefore, when the external terminal is used in the vehicle, for example, the driver can remotely operate the external terminal by the operation input unit mounted in the vehicle without directly touching the external terminal, making it possible to drive while operating the external terminal in a state where safety is ensured.

According to the display control apparatus having the configuration of (5), the synthesized image containing the image from the external terminal can be displayed on the screen of the meter display. Therefore, it is possible to simultaneously display both the image from the external terminal and important information on driving state normally required for driving the vehicle. That is, the image from the external terminal can also be displayed using a part of the screen of the meter display. Accordingly, it is not necessary to prepare a special in-vehicle display for the external terminal and the information on traveling state can be prevented from disappearing from the screen when the external terminal is displaying the image.

According to the display control apparatus of the present invention, when the screen of the user's mobile terminal is displayed on the screen of the meter unit and the like mounted on the vehicle, it is possible to cope with changes in specifications of the mobile terminal by changes to the additional control device alone without necessary changes to the meter unit. Moreover, display can be realized in an appropriate form corresponding to specification changes in the external terminal or a plurality of types of specifications of the display device, since it is possible to select an appropriate display form using the setting information stored in the storage unit of the control device.

The present invention is briefly described as above. Details of the present invention will be further clarified by reading a mode (hereinafter, referred to as "embodiment") for carrying out the present invention described below with reference to the accompanying drawing.

BRIEF DESCRIPTION OF DRAWINGS

FIGS. 7A, 7B, and 7C are block diagrams respectively showing three types of connection forms.

DESCRIPTION OF EMBODIMENTS

A specific embodiment according to the present invention will be described with reference to drawings below.

<Configuration Example of System>

Figure 1:
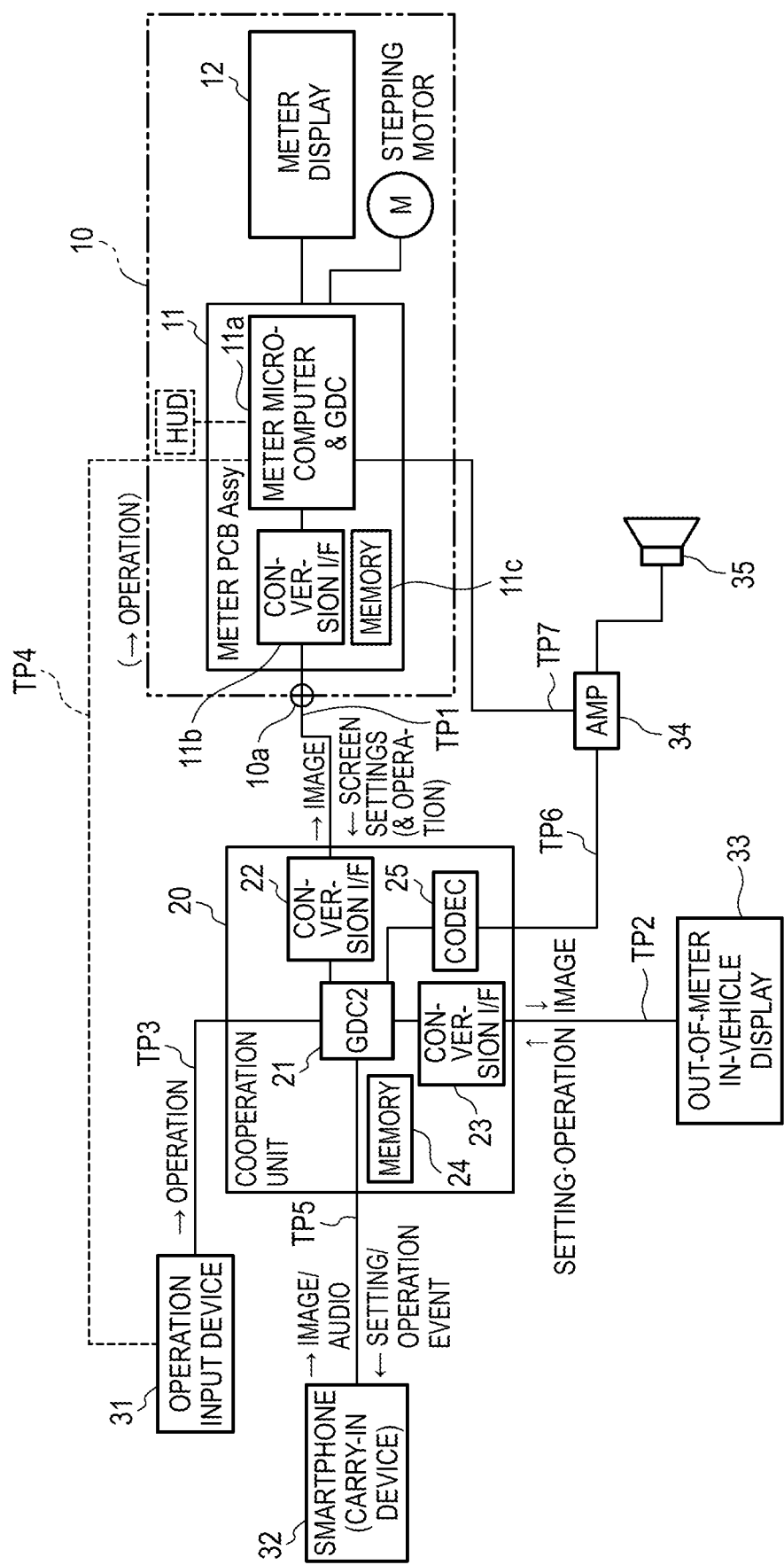
FIG. 1 is a block diagram showing a configuration example of a system including a display control apparatus according to an embodiment of the present invention.

FIG. 1 is a block diagram showing a configuration example of a system including a display control apparatus according to an embodiment of the present invention.

In the system shown in FIG. 1, elements except a smartphone 32 are used while being installed on a vehicle. A meter device 10 is used to display, in the same manner as a typical vehicle meter, a speedometer, an engine tachometer, and other information necessary for driving the vehicle.

The meter device 10 shown in FIG. 1 includes a meter circuit board 11 and a meter display 12 disposed in the housing thereof. The meter display 12 is a color display device formed of, for example, thin film transistor (TFT) liquid crystal and has a large number of display pixels arranged on a two-dimensional plane, which can display an image.

The meter device 10 may further include a head-up display (HUD). A device disposed outside the meter device 10 may also be used as the meter display 12.

The meter circuit board 11 includes a circuit component having a meter control unit 11a, a conversion interface (I/F) 11b, and a memory 11c. The meter control unit 11a has a microcomputer and a graphic display controller (GDC) as an element necessary for control of the meter device 10.

The conversion interface 11b has a function of connecting and communicating with a cooperation unit 20. The memory 11c is formed by a read-only memory (ROM) or a nonvolatile memory and stores in advance information on a cooperation pattern necessary for cooperation with an external device, specifically, display parameter information corresponding to the screen size (the number of pixels) of the meter display 12 connected to the meter circuit board 11.

The cooperation unit 20 is a device that enables cooperation between the meter device 10 and an external device such as the smartphone 32 brought into the vehicle by a user. The cooperation unit 20 is detachably connected to a meter connection portion 10a of the meter device 10 by a connector or the like. The cooperation unit 20 and the meter device 10 are connected by a signal transmission line TP1. A connection cable is usually used for the signal transmission line TP1, but wireless connection is also possible.

The cooperation unit 20 can send a signal of image data to the meter device 10 by using the signal transmission line TP1. In the present embodiment, the cooperation unit 20 does not send signals other than image data to the meter device 10. Further, information necessary for screen settings of the meter display 12 and the like and operation information and the like are sent from the meter device 10 to the cooperation unit 20.

The cooperation unit 20 includes conversion interfaces 22, 23, a memory 24, a CODEC 25, and a cooperation control unit (GDC2) 21.

The cooperation control unit 21 is connected to the meter device 10 via the conversion interface 22. Further, the cooperation control unit 21 is connected to an out-of-meter in-vehicle display 33 via the conversion interface 23. The out-of-meter in-vehicle display 33 is optional and may not exist.

A signal transmission line TP2, which connects the cooperation unit 20 and the out-of-meter in-vehicle display 33, can send a signal containing image data from the cooperation unit 20 to the out-of-meter in-vehicle display 33. Information on screen settings and input operation can also be sent from the out-of-meter in-vehicle display 33 to the cooperation unit 20.

An external terminal such as the smartphone 32 brought into the vehicle by the user can be connected to the cooperation control unit 21 in the cooperation unit 20 via a signal transmission line TP5. The signal transmission line TP5 is wired or wireless. With the signal transmission line TP5, bidirectional data communication is possible and data such as images and audio can be transmitted from the smartphone 32 to the cooperation unit 20. Further, information for setting the smartphone 32 and information on an operation event generated by the vehicle can be sent from the cooperation unit 20 to the smartphone 32.

An operation input device 31 includes an operation unit such as a button disposed on a steering wheel, which is safely operable by a driver even during driving. The operation input device 31 is connected to the cooperation control unit 21 in the cooperation unit 20 via a signal transmission line TP3. The operation input device 31 can send information on operation generated by the operation input device 31 to the cooperation unit 20. The operation input device 31 may also be treated as an option. The operation input device 31 and the meter circuit board 11 can be connected via a signal transmission line TP4.

The conversion interface 23 has a function of performing communication between the cooperation control unit 21 and the out-of-meter in-vehicle display 33. The cooperation control unit 21 can transmit data of an image from the smartphone 32 or the like to the out-of-meter in-vehicle display 33 via the conversion interface 23 and the signal transmission line TP2. Various types of setting information and operation information that can be transmitted by the out-of-meter in-vehicle display 33 are input to the cooperation control unit 21 via the signal transmission line TP2 and the conversion interface 23.

The memory 24 in the cooperation unit 20 is a device of a read-only memory or a nonvolatile memory and stores in advance various types of data necessary for cooperation operation of the cooperation unit 20. As will be described below in detail, the memory 24 stores data of a cooperation pattern that is necessary when screen display of an external terminal such as the smartphone 32 and screen display by the meter display 12 of the meter device 10 or the like cooperate with each other. In addition, various types of software necessary for operation of the cooperation control unit 21 can also be stored in the memory 24.

The CODEC 25 embedded in the cooperation unit 20 has a function of reproducing encoded data such as audio transmitted by the smartphone 32 or the like. The output of the CODEC 25 is connected to the input of an amplifier (AMP) 34 via a signal transmission line TP6. The output of the amplifier 34 is connected to a speaker 35. Further, another input of the amplifier 34 is connected to the meter device 10 via a signal transmission line TP7. The amplifier 34 and the speaker 35 are mounted on the vehicle.

<Appearance Example of Meter Device>

Figure 2:
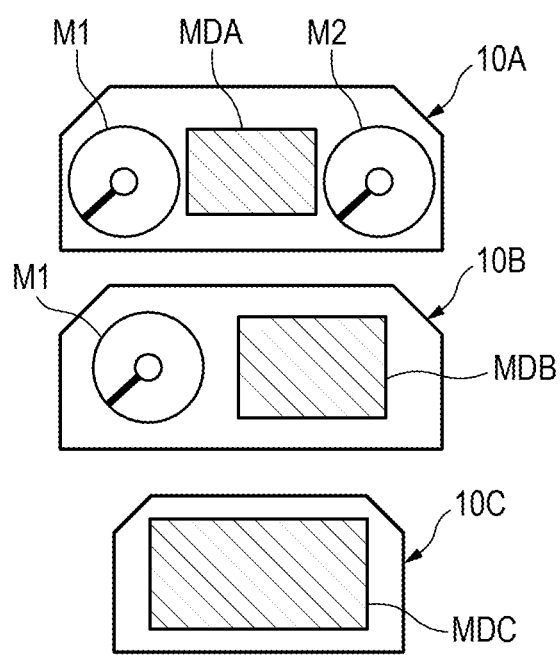
FIG. 2 is a front view showing the appearance of three types of meter devices.

The schematic appearance of three types of meter devices 10A, 10B, and 10C are shown in FIG. 2.

In the case of the meter device 10A shown in FIG. 2, the screen of a meter display MDA is arranged at a middle portion of a panel disposed on a front surface of a housing of the meter device 10A, a speed meter M1 is arranged on a left side, and a tachometer M2 is arranged on a right side.

On the other hand, in the case of the meter device 10B shown in FIG. 2, the screen of a meter display MDB is arranged on a right half of a panel disposed on a front surface of a housing of the meter device 10B, and the speed meter M1 is arranged on a left side of the panel. In the case of the meter device 10C shown in FIG. 2, the screen of a meter display MDC is arranged in a range substantially equal to the entire area of a panel disposed on a front surface of a housing of the meter device 10C.

That is, in the three types of meter devices 10A, 10B, and 10C shown in FIG. 2, sizes (actual physical sizes, the total number of pixels, and the like) of the meter displays MDA, MDB, and MDC are different from each other. In the case of the meter device 10B, information corresponding to the tachometer M2 may be displayed on the meter display MDB since the tachometer M2 is not provided. In the case of the meter device 10C, it is necessary to display on the meter display MDC information on vehicle speed and engine rotational speed corresponding to the speedometer M1 and the tachometer M2, since the speedometer M1 and the tachometer M2 are not provided.

Differences between the three types of meter devices 10A, 10B, and 10C shown in FIG. 2 are appropriately selected in accordance with differences in vehicle type and grade of the vehicle on which the meter devices 10A, 10B, and 10C are mounted. Configurations of the meter devices 10A, 10B, and 10C may be further changed in accordance with, for example, regular changes in design and specification of the vehicle.

Therefore, when the same image as the display screen on the smartphone 32 is displayed on the screen of the meter display 12 of the meter device 10, correct display is not possible unless the differences in type and specification of the meter devices shown in FIG. 2 are considered.

The cooperation unit 20 in FIG. 1 has a function of absorbing the differences in type and specification of meter devices 10 as shown in FIG. 2 and performing appropriate cooperation between the smartphone 32 and the meter display 12. Actually, information on a cooperation pattern corresponding to the differences in type and specification of the meter devices 10 as shown in FIG. 2 is stored in advance in the memory 11c of the meter devices 10A to 10C. The cooperation unit 20 acquires information stored in the memory 11c from the meter device 10 and reflects the acquired information in the subsequent cooperation control. Details will be described below.

<Configuration Example of Cooperation Pattern Table>

Figure 3:
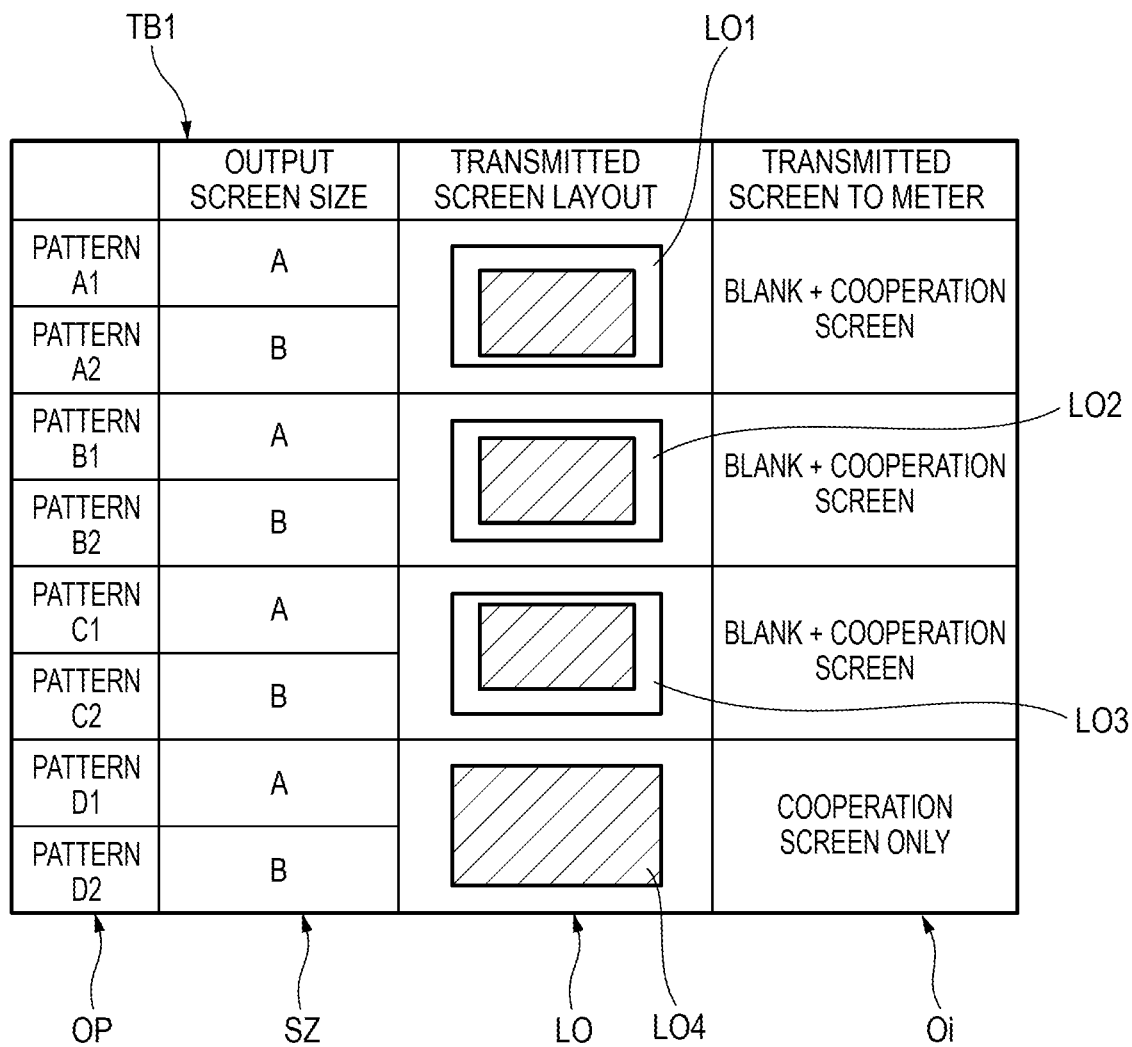
FIG. 3 is a schematic diagram showing a configuration example of a cooperation pattern table.

A configuration example of a cooperation pattern table TB1 is shown in FIG. 3. The cooperation pattern table TB1 shown in FIG. 3 is stored in advance in the memory 24 of the cooperation unit 20.

In the example shown in FIG. 3, the cooperation pattern table TB1 contains information on items OP, SZ, LO, and Oi.

Information on the item OP indicates differences in cooperation pattern in the cooperation unit 20. In the example of FIG. 3, data representing patterns A1, A2, B1, B2, C1. C2, D1, and D2 is contained as the information on the item OP.

Information on the item SZ represents differences in screen size (such as the number of pixels) of the meter display 12 or the like connected to the output of the cooperation unit 20 and contains two types of data of "A" and "B" in the example of FIG. 3.

Information on the item LO represents differences in screen layout to be transmitted in alignment with the screen of the meter display 12 or the like connected to the output of the cooperation unit 20 and contains four types of data of layout information LO1, LO2, LO3, and LO4 in the example of FIG. 3. The layout information LO1 indicates that "cooperation screen" is aligned with a lower side of "blank", the layout information LO2 indicates that "cooperation screen" is aligned with the middle of "blank", the layout information LO3 indicates that "cooperation screen" is aligned with an upper side of "blank", and the layout information LO4 indicates only "cooperation screen".

Information on the item Oi represents differences in type of image synthesis output from the cooperation unit 20 to the meter device 10. The example in FIG. 3 shows two types of information indicating that "blank" and "cooperation screen" are synthesized and output and information indicating that only "cooperation screen" is output.

<Communication for Cooperation Pattern Determination>

Figure 4:
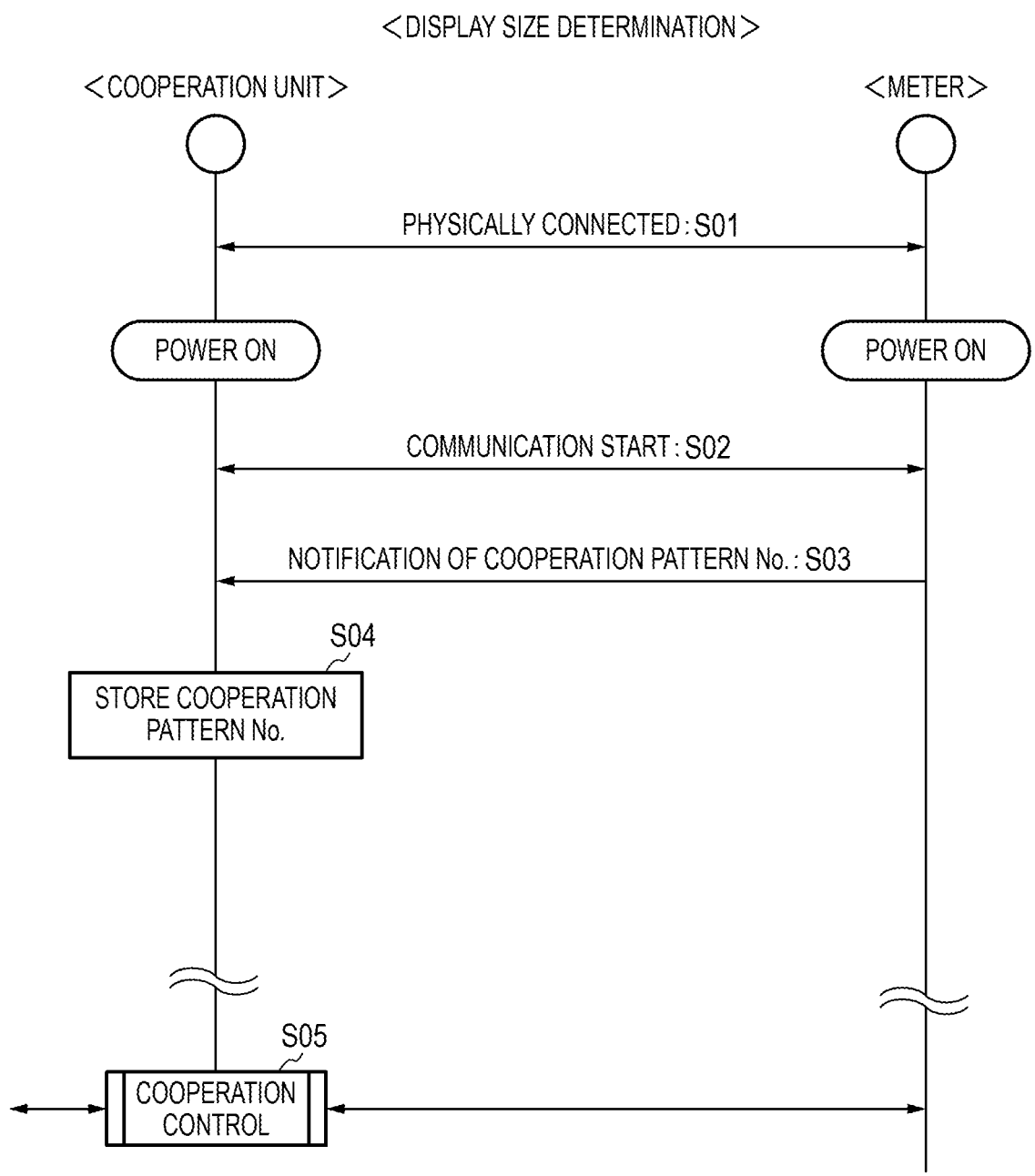
FIG. 4 is a sequence diagram showing communication operation for determining a cooperation pattern between a meter device and a cooperation unit.

Communication operation for determining a cooperation pattern between the meter device 10 and the cooperation unit 20 is shown in FIG. 4. The operation in FIG. 4 is described below.

First, the meter device 10 and the cooperation unit 20 are physically connected by manual operation of an operator using a predetermined communication cable or the like corresponding to the signal transmission line TP1 shown in FIG. 1, so that communication is possible (step 01 (S10)). The connection may be automated in the case of wireless connection.

When power sources of the meter device 10 and the cooperation unit 20 are turned on, communication is started between the meter device 10 and the cooperation unit 20 using a path passing through the conversion interface 22, the signal transmission line TP1, and the conversion interface 11b (S02). It is preferable that the meter device 10 performs authentication of the cooperation unit 20 as the connection partner before the communication is started, so as to prevent an unauthorized device from being connected.

The meter device 10 reads information on a cooperation pattern number representing its own type from the memory 11c and notifies the cooperation unit 20 of the information (S03). The coordination pattern number can be used, for example, to identify any one cooperation pattern in the cooperation pattern table TB1 shown in FIG. 3.

The cooperation unit 20 stores the information on cooperation pattern number notified from the meter device 10 in its own memory or the memory 24 (S04), and uses the information on cooperation pattern number in cooperation control in step S05.

<Cooperation Operation of Cooperation Unit>

Figure 5:
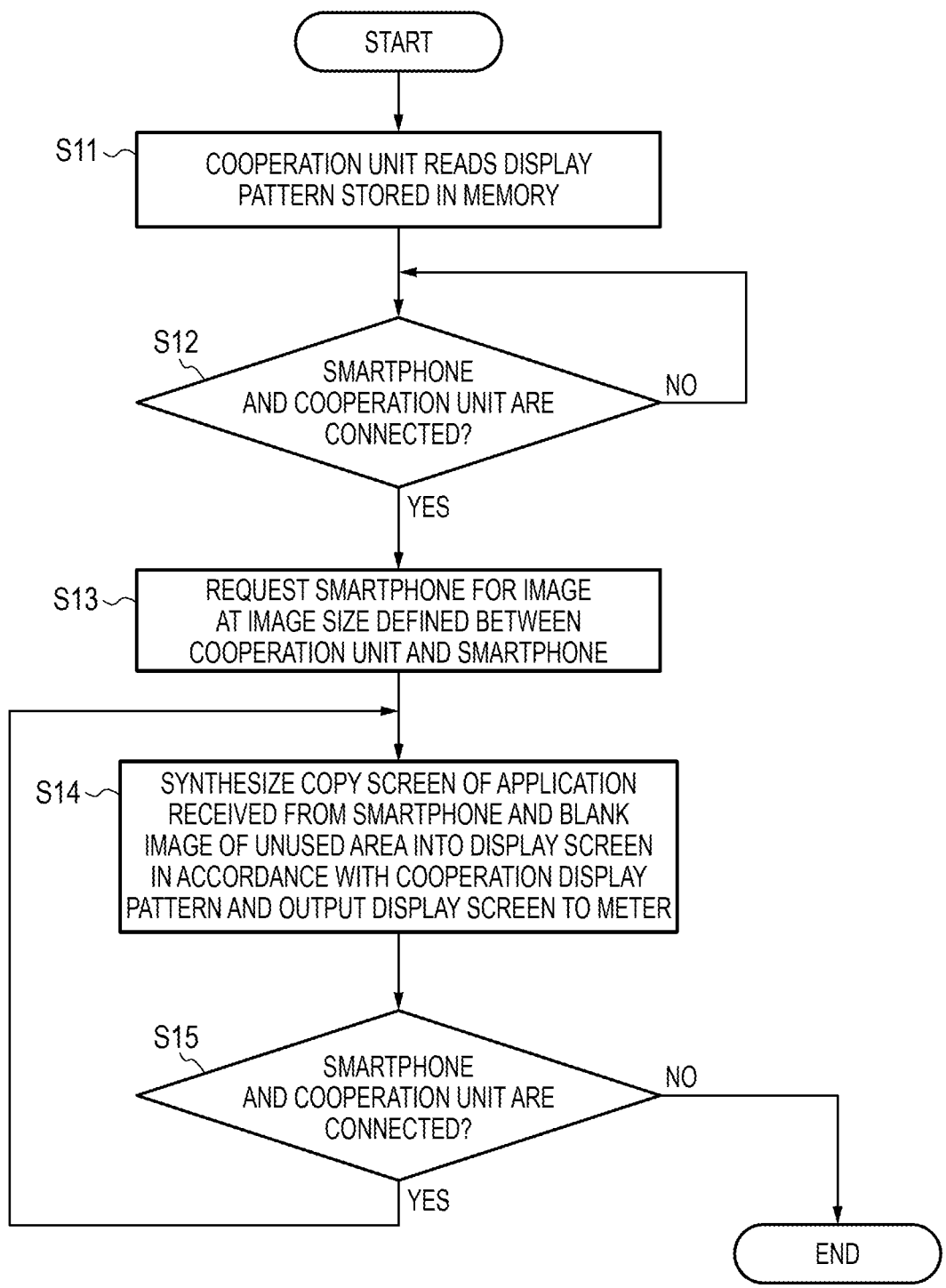
FIG. 5 is a flowchart showing cooperation operation of the cooperation unit.

An outline of cooperation operation in the cooperation unit 20 is shown in FIG. 5. The operation shown in FIG. 5 corresponds to step S05 in FIG. 4. The operation in FIG. 5 is described below.

The cooperation unit 20 specifies a cooperation pattern in the cooperation pattern table TB1 in the memory 24 based on the information on cooperation pattern number stored in S04 in FIG. 4, and acquires corresponding pattern data. That is, the cooperation unit 20 specifies a combination of values of the items OP, SZ, LO, and Oi from the cooperation pattern table TB1 (S11).

For example, when the cooperation pattern number is "1", the cooperation control unit 21 acquires cooperation information obtained by combining "pattern A", "size A", "layout information LO1", and "blank+cooperation screen" in the uppermost row of the cooperation pattern table TB1.

The cooperation control unit 21 detects in S12 whether the smartphone 32 is connected to the cooperation unit 20 for communication and proceeds to S13 when the smartphone 32 is connected. Then, the cooperation control unit 21 selects an available image size and the size of an image to be acquired by the cooperation control unit 21 through bilateral communication with the smartphone 32, and requests the smartphone 32 to output the image at the selected size (S13).

On the other hand, in response to the request of S13 from the cooperation unit 20, the smartphone 32 transmits copy screen data of the content displayed on its own screen as a result of executing application software through the signal transmission line TP5 in an image format of the requested size.

The cooperation control unit 21 of the cooperation unit 20 performs size conversion processing for adjusting the screen size of the copy screen data received from the smartphone 32 for alignment with the meter display 12 or the like (S14). Generation and a layout of a synthesized image are automatically adjusted as necessary. Details will be described below.

The cooperation control unit 21 of the cooperation unit 20 identifies in S15 whether the connection with the smartphone 32 is continued and repeats the processing of S14 when the connection continues. When the connection with the smartphone 32 is cut off, the processing in FIG. 5 is ended.

Although not shown in FIG. 5, data such as audio and music to be transmitted to the cooperation unit 20 by the smartphone 32 is input to the CODEC 25 via the cooperation control unit 21 and is reproduced as an audio signal or the like. The signal is amplified by the amplifier 34 and is output as sound from the speaker 35. An audio signal or the like output from the meter device 10 is also amplified by the amplifier 34 and output as sound from the speaker 35.

<Processing for Generating Synthesized Image>

Figure 6:
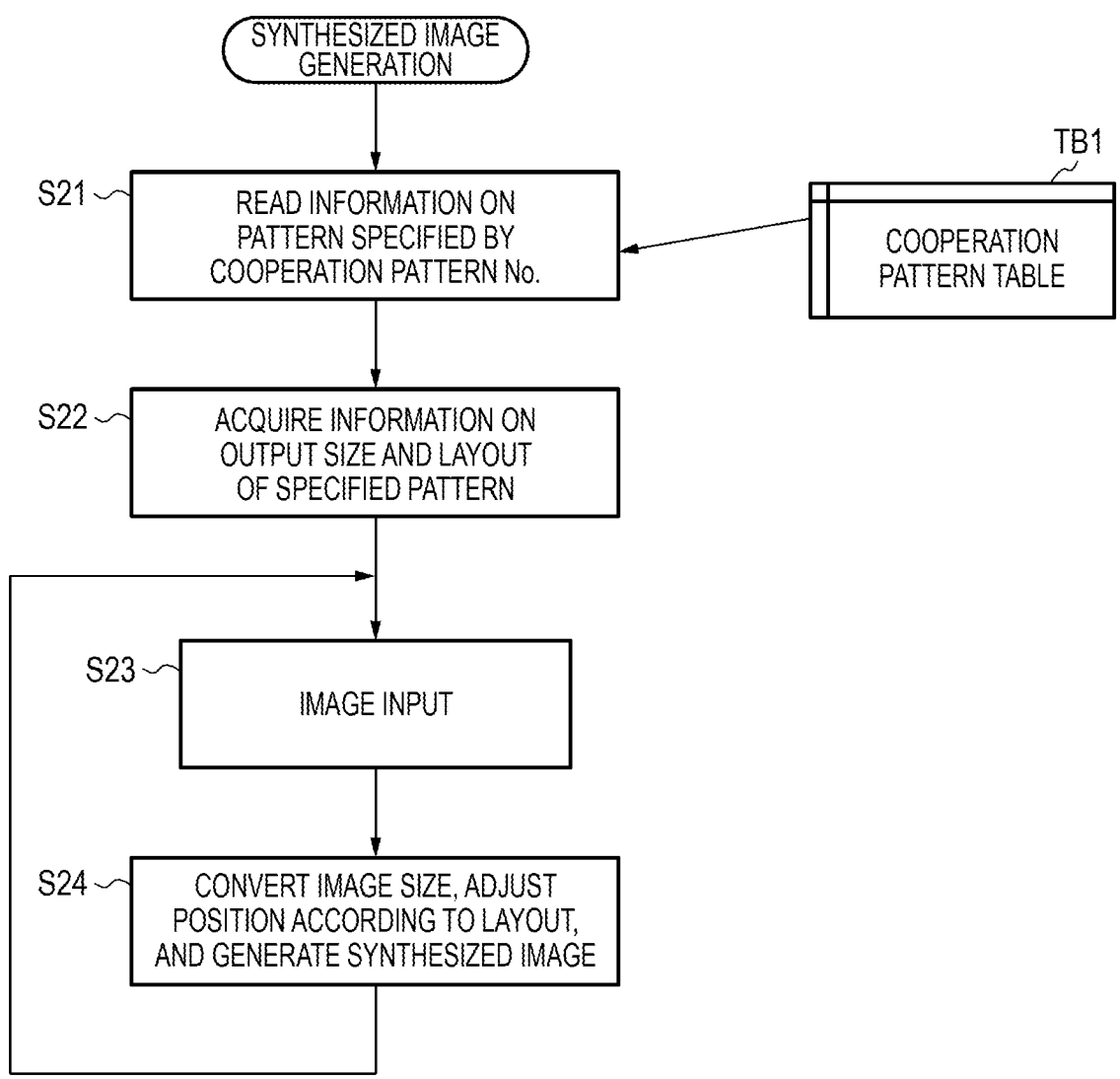
FIG. 6 is a flowchart showing processing for synthesizing an image in the cooperation unit.

Processing for generating a synthesized image in the cooperation unit 20 is shown in FIG. 6. For example, in step S14 shown in FIG. 5, the cooperation control unit 21 executes the processing in FIG. 6. The processing in FIG. 6 is described below.

The cooperation control unit 21 reads and acquires, from the cooperation pattern table TB1, information on the pattern specified by the cooperation pattern number acquired in advance from the meter device 10 (S21).

The cooperation control unit 21 acquires information on the output size (SZ), the layout (LO), and the output synthesis (Oi) in the specified pattern (S22).

The cooperation control unit 21 inputs in S23 image data of the copy screen acquired from the smartphone 32 and performs necessary image processing using GDC (S24). Specifically, an output image is generated by reducing or enlarging an image so that the size of the acquired image matches the output screen size (SZ). In the generated output image, the position in the image frame of the output destination and the output image are relatively aligned in accordance with the layout (LO) of the transmitted screen. When the content of the item Oi is "blank+cooperation screen", a synthesized image is generated by combining an output image of the cooperation screen generated in accordance with the output of the smartphone 32 and a blank image.

The blank image is, for example, an image arranged in a rectangular area having a shape larger than the rectangular cooperation screen so as to surround an outer side of the cooperation screen. The blank image contains data of a blank (for example, a set of pixels colored in a designated color) irrelevant to the content of the cooperation screen.

The cooperation control unit 21 outputs the synthesized image generated in S24 or the output image of the cooperation screen to the signal transmission line TP1 via the conversion interface 22 and transmits it to the meter device 10. Therefore, when the meter device 10 displays the image of the smartphone 32 on the screen of the meter display 12, the result of the image processing in S24 by the cooperation control unit 21 is reflected in the display content of the meter display 12.

That is, the image size of the content displayed on the meter display 12 is automatically adjusted in accordance with the image frame size or the like of the meter display 12, and the position is automatically adjusted in accordance with the image frame. When the synthesized image is displayed, an area in which the cooperation screen is not displayed becomes the blank image. By repeating the processing of step S14 shown in FIG. 5, the meter display 12 can always display the same content as the screen of the smartphone 32.

The area of the blank image displays information other than the image of the smartphone 32, for example, information such as the vehicle speed, the engine rotational speed, and a shift position of a transmission, using other layers under the control of the meter control unit 11a.

Regarding control for cooperating the display of the smartphone 32 and the display of the meter display 12 of the meter device 10, the meter control unit 11a does not need to perform special control other than step S03 shown in FIG. 4; other necessary control can be performed by the cooperation unit 20.

Therefore, for example, even when communication specifications or display specifications (screen size and the like) on the smartphone 32 change, the change can be absorbed by changes to the cooperation unit 20 alone. For this reason, even when the user of the vehicle continues to use the same vehicle and the meter device 10 for a long period of time, the screen of the latest smartphone 32 can be displayed on the meter display 12.

<Three Types of Connection Example>

Three types of connection forms are shown in FIGS. 7A, 7B, and 7C.

In the example shown in FIG. 7A, it is assumed that the cooperation unit 20 and the smartphone 32 are connected via the signal transmission line TP5, the cooperation unit 20 and a meter device 10-1 are connected via the signal transmission line TP1, and the cooperation unit 20 and the out-of-meter in-vehicle display 33 are connected via the signal transmission line TP2. In this case, the screen size of the smartphone 32 is, for example, full HD, that is, 1920×1080 pixels.

In the meter device 10-1 shown in FIG. 7A, the screen of a meter display 12A has the same size as a housing front panel of the meter device 10-1. Therefore, in the case of the meter device 10-1, it is necessary to provide a function of displaying information on vehicle speed and engine rotational speed inside the meter display 12A, which is similar to the meter device 10C in FIG. 2.

Therefore, in the example shown in FIG. 7A, the size of a terminal display area WA for displaying the cooperation screen of the smartphone 32 is significantly smaller than the size of the entire screen of the meter display 12A. In the image frame of the meter display 12A, the relative position for the terminal display area WA is fixed in advance.

In the meter device 10-1 shown in FIG. 7A, information indicating specifications of the meter display 12A, that is, the size of the entire meter display 12A, the size of the terminal display area WA, the relative position of the terminal display area WA, necessary differences of presence and absence of the blank image, and the like are stored in the memory 11c in advance.

In the cooperation unit 20 shown in FIG. 7A, the cooperation control unit 21 receives image data of the cooperation screen having a predetermined size from the smartphone 32, and generates image data in accordance with specifications of the terminal display area WA of the meter display 12A. That is, according to information acquired from the cooperation pattern table TB1 based on the cooperation pattern number (pattern D) of the memory 11c, image data in accordance with specifications such as screen size conversion, position adjustment in the image frame, presence and absence of blank image addition is transmitted to the meter device 10-1 via the signal transmission line TP1.

Therefore, the meter device 10-1 can receive the image data received from the cooperation unit 20, and display a copy screen equivalent to the screen of the smartphone 32 in the terminal display area WA in the meter display 12A.

In the example of FIG. 7A, in addition to the meter device 10-1, the out-of-meter in-vehicle display 33 is connected to the cooperation unit 20. Accordingly, the cooperation unit 20 also generates image data in accordance with specifications (pattern D) of the out-of-meter in-vehicle display 33, and transmits the data to the out-of-meter in-vehicle display 33. Therefore, a copy screen equivalent to the screen of the smartphone 32 can be displayed in an area (for example, the entire frame area) 33a of the out-of-meter in-vehicle display 33.

On the other hand, in the example of FIG. 7B, a meter device 10-2 is connected to the cooperation unit 20. In the meter device 10-2, a meter display 12B having a shape smaller than a housing front panel of the meter device 10-2 is arranged in a middle portion. Therefore, the speedometer M1, the tachometer M2, and the like can be arranged in left and right areas of the meter display 12B, which is similar to the meter device 10A in FIG. 2, for example. For this reason, in the example of FIG. 7B, the entire frame of the meter display 12B is allocated as a terminal display area WB.

In the meter device 10-2 shown in FIG. 7B, information indicating specifications of the meter display 12B, that is, the size of the entire meter display 12B, the size of the terminal display area WB, the relative position of the terminal display area WB, necessary differences of presence and absence of the blank image, and the like are stored in the memory 11c in advance.

In the cooperation unit 20 shown in FIG. 7B, the cooperation control unit 21 receives image data of the cooperation screen having a predetermined size from the smartphone 32, and generates image data in accordance with specifications of the terminal display area WB of the meter display 12B. That is, according to information acquired from the cooperation pattern table TB1 based on the cooperation pattern number (pattern B) of the memory 11c, image data in accordance with specifications such as screen size conversion, position adjustment in the image frame, presence and absence of blank image addition is transmitted to the meter device 10-2 via the signal transmission line TP1.

Therefore, the meter device 10-2 can receive the image data received from the cooperation unit 20, and display a copy screen equivalent to the screen of the smartphone 32 in the terminal display area WB in the meter display 12B. The screen display of the out-of-meter in-vehicle display 33 is the same as that shown in FIG. 7A.

On the other hand, in the example of FIG. 7C, a meter device 10-3 is connected to the cooperation unit 20. In the meter device 10-3, a meter display 12C having a shape smaller than a housing front panel of the meter device 10-3 is arranged in a middle portion. Therefore, the speedometer M1, the tachometer M2, and the like can be arranged in left and right areas of the meter display 12B, which is similar to the meter device 10A in FIG. 2, for example.

In the example of FIG. 7C, the size of a terminal display area WC is smaller than the size of the entire frame of the meter display 12C so that information other than the terminal display area WC can be simultaneously displayed in the frame of the meter display 12C as well.

In the meter device 10-3 shown in FIG. 7C, information indicating specifications of the meter display 12C, that is, the size of the entire meter display 12C, the size of the terminal display area WC, the relative position of the terminal display area WC, necessary differences of presence and absence of the blank image, and the like are stored in the memory 11c in advance.

In the cooperation unit 20 shown in FIG. 7C, the cooperation control unit 21 receives image data of the cooperation screen having a predetermined size from the smartphone 32, and generates image data in accordance with specifications of the terminal display area WC of the meter display 12C. That is, according to information acquired from the cooperation pattern table TB1 based on the cooperation pattern number (pattern B) of the memory 11c, image data in accordance with specifications such as screen size conversion, position adjustment in the image frame, presence and absence of blank image addition is transmitted to the meter device 10-3 via the signal transmission line TP1.

Therefore, the meter device 10-3 can receive the image data received from the cooperation unit 20, and display a copy screen equivalent to the screen of the smartphone 32 in the terminal display area WC in the meter display 12C. The screen display of the out-of-meter in-vehicle display 33 is the same as that shown in FIG. 7A.

<Control Other than Image Display>

Although control related to image display is described above, the cooperation unit 20 performs control other than image display in the system shown in FIG. 1, as will be described below.

The cooperation control unit 21 of the cooperation unit 20 can receive operation information of the user input from the operation input device 31 and operation information of the user indicating input operation to an operation unit (not shown) of the out-of-meter in-vehicle display 33. The cooperation control unit 21 then converts the received operation information of the user into data representing a recognizable event of the smartphone 32 or a switch state, and transmits it to the smartphone 32. Therefore, when the cooperation unit 20 is used, the user can remotely operate the screen of the smartphone 32 by operating the operation input device 31 or the out-of-meter in-vehicle display 33.

<Advantages of Display Control Apparatus>

In the in-vehicle system shown in FIG. 1, the cooperation unit 20 that is detachable from the meter device 10 is prepared, so that cooperation between the smartphone 32 and the screen display of the meter device 10 is controlled by the cooperation unit 20. Therefore, it is possible to cope with changes in communication specifications and screen specifications in the smartphone 32 by changes to the cooperation unit 20 alone without changing the configuration or operation of the meter device 10. That is, when hardware of the smartphone 32 or application software is changed, it is possible to cope therewith by only changing software on the cooperation unit 20.

Further, it is easy to ensure security in the vehicle since the cooperation unit 20 is interposed between the smartphone 32 and the meter device 10. That is, it is possible to prevent an external terminal such as the smartphone 32 from illegally accessing the system in the vehicle with the function of the cooperation unit 20.

In the in-vehicle system shown in FIG. 1, the cooperation unit 20 can easily grasp an appropriate image size and the like to be output to the meter device 10, since the memory 11c of the meter device 10 stores cooperation pattern numbers representing differences in specification of the display screen or the like of the meter device 10. When the cooperation unit 20 stores the cooperation pattern table TB1 as shown in FIG. 3, the cooperation unit 20 having the same configuration can be commonly connected to a plurality of types of meter devices 10A, 10B, 10C, and the like. Therefore, it is not necessary to manufacture a plurality of types of cooperation units 20 respectively for each type of the meter device 10.

Features of the display control apparatus according to the embodiment of the present invention are briefly summarized in the following [1] to [5].

[1] The display control apparatus includes: a control device (meter circuit board 11) connected to a display device (meter display 12) and configured to output image data to the display device and display an image on a display screen; and an additional control device (cooperation unit 20) retrofitted to the control device and configured to output image data input from an external terminal to the control device.

The control device includes a storage unit (memory 11c) that stores setting information (cooperation pattern number) on a display form of an image on the display screen.

The additional control device includes a data modification unit (cooperation control unit 21) configured to acquire the setting information from the control device, modify the image data input from the external terminal into data in accordance with the display mode based on the setting information, and output the data to the control device.

[2] In the display control apparatus according to [1], the setting information contains information on a display size (item SZ) of an image on the display screen.

The data modification unit modifies the image data input from the external terminal so that a display size of the image data matches the display size contained in the setting information (S24).

[3] In the display control apparatus according to [1] or [2], the setting information contains information (item LO) on a display position of an image on the display screen.

The additional control device modifies the image data input from the external terminal so that an image of the image data on the display screen is in the display position contained in the setting information (S24).

[4] The display control apparatus according to any one of [1] to [3] further includes an operation input unit (operation input unit 31) configured to output an operation signal for changing an output state of image data in the external terminal in response to an input operation.

The additional control device outputs the operation signal input from the operation input unit to the external terminal and changes the output state.

[5] In the display control apparatus according to any one of [1] to [4], the display screen is a meter display that displays information indicating a traveling state of a vehicle.

The control device acquires the information indicating a traveling state, generates image data related to the traveling state, synthesizes an image of the generated image data and an image of the image data input from the external terminal, and displays the synthesized image on the display screen (display form of meter display 12A in FIG. 7A).

What is claimed is:

1. A display control apparatus comprising:
   a first controller connected to a display unit and configured to output image data to the display unit and display an image on a display screen; and
   a second controller retrofitted to the first controller and configured to output image data input from an external terminal to the first controller,
   wherein the first controller includes a storage unit that stores layout information on a display form of an image on the display screen, and
   wherein the second controller includes a data modification unit configured to acquire the layout information from the first controller, correct the image data input from the external terminal into data in accordance with the display form based on the layout information, and output the data to the first controller.

2. The display control apparatus according to claim 1, wherein
   the layout information contains information on a display size of an image on the display screen, and
   the data modification unit corrects the image data input from the external terminal so that a display size of the image data matches a display size contained in the layout information.

3. The display control apparatus according to claim 1, wherein
   the layout information contains information on a display position of an image on the display screen,
   the second controller corrects the image data input from the external terminal so that an image of the image data on the display screen is in a display position contained in the layout information.

4. The display control apparatus according to claim 1, further comprising an operation input unit configured to output an operation signal for changing an output state of image data in the external terminal according to an input operation,
   wherein the second controller outputs the operation signal input from the operation input unit to the external terminal and changes the output state.

5. The display control apparatus according to claim 1, wherein
   the display screen is a meter display that displays information indicating a traveling state of a vehicle, and
   the first controller acquires the information indicating the traveling state, generates image data related to the traveling state, synthesizes an image of the generated image data and an image of the image data input from the external terminal, and displays the synthesized image on the display screen.

* * * * *